United States Patent [19]

Winters

[11] Patent Number: 4,639,914

[45] Date of Patent: Jan. 27, 1987

[54] WIRELESS PBX/LAN SYSTEM WITH OPTIMUM COMBINING

[75] Inventor: Jack H. Winters, Middletown, N.J.

[73] Assignee: AT&T Bell Laboratories, Murray Hill, N.J.

[21] Appl. No.: 679,067

[22] Filed: Dec. 6, 1984

[51] Int. Cl.[4] .......................... H04J 3/12; H04Q 7/00; H04B 1/00

[52] U.S. Cl. .................................. 370/110.1; 455/33; 455/54; 455/69

[58] Field of Search ............... 455/33, 54, 69; 370/77, 370/110.1

[56] References Cited

U.S. PATENT DOCUMENTS

| | | | |
|---|---|---|---|
| 2,678,998 | 5/1954 | Young, Jr. | 455/54 |
| 4,210,871 | 7/1980 | Hill et al. | 455/137 |
| 4,217,586 | 8/1980 | McGuffin | 343/100 |
| 4,222,115 | 9/1980 | Cooper et al. | 455/54 |
| 4,232,392 | 11/1980 | French | 455/54 |
| 4,369,520 | 1/1983 | Cerny, Jr. et al. | 455/137 |
| 4,383,332 | 5/1983 | Glance et al. | 455/33 |
| 4,397,036 | 8/1983 | Hirade et al. | 455/137 |
| 4,481,670 | 11/1984 | Freeburg | 455/33 |

OTHER PUBLICATIONS

"Optimum Signal Processing For Adaptive Arrays with Broadband Signals and Interferers", by J. H. Park, Jr., National Telecom. Conf., Nov.-Dec. 1985, vol. 2 of 4, pp. C7.6.1-C7.6.5.
"An Analysis of Adaptive Retransmission Arrays in a Fading Environment", by Y. S. Yeh, Bell System Tech. Journal, Oct. 1970, pp. 1811-1825.
"A New Approach to High-Capacity Digital Mobile Radio", by Henry and Glance, The Bell System Tech. Journal, vol. 60, No. 8, Oct. 1981, pp. 1891-1904.
"Optimum Combining in Digital Mobile Radio with Cochannel Interference", by J. H. Winters, IEEE Journ.-Selected Areas in Comm., vol. Sac-2, No. 4, Jul. 1984, pp. 528-539.
"Optimum Combining in Digital Mobile Radio with Co-Channel Interference", by J. H. Winters, IEEE Int'l Conf. on Comm: Integrat. Comm. for World Progress, Jul. 1983, B8.4.1-B8.4.5.
"Portable Computer and Host Talk over Radio-Frequency Link", by J. Krebs, Electronics, Aug. 1983, pp. 142-145.

Primary Examiner—Douglas W. Olms
Assistant Examiner—Frank M. Scutch, III
Attorney, Agent, or Firm—Patrick E. Roberts; Robert O. Nimtz

[57] ABSTRACT

A wireless PBX or LAN system is disclosed that allows multiple, simultaneous users per channel for communication between a base station and a plurality of remote terminals by a combination of adaptive signal processing arrays using optimum combining at the base station for interference suppression and separation of desired signals, adaptive power control at the remote terminals to keep interference at acceptable levels, and adaptive retransmission with time division in the direction from the base station to the remote terminals for communication therebetween including sending power control information to the remote terminals. The adaptive signal processing arrays have a plurality of antennas at the base station, permitting a plurality of users in any one channel. If after adaptation a user's signal cannot be received adequately, the user is dynamically reassigned to a different channel. Interference is minimized by keeping the signals transmitted from and received at the base station at the same power level. The received signals are kept at the same power level by extracting information about the power level of the signals received at the base station and by sending power control bits back to the corresponding remote terminal so that the signal level from the remote terminal may be adjusted either up or down until the power level of each of the signals received at the base station is at the same level. The transmitted signals are kept at the same power level by adaptive retransmission with time division.

9 Claims, 8 Drawing Figures

BASE STATION FLOWCHART

WIRELESS PBX/LAN SYSTEM WITH OPTIMUM COMBINING

TECHNICAL FIELD

This invention relates to radio frequency antenna combining systems and, in particular, to the application of such a system to a PBX system or a local area network which has no wire interconnecting the remote terminals with a base station and in which adaptive power control is used at the remote transmitters to reduce interference.

BACKGROUND OF THE INVENTION

A traditional private branch exchange (PBX) is used inside a building and has a base station comprising a switching system connected, through wiring inside the building, to a plurality of remote terminals such as telephone sets, data sets, teletypewriters, computer terminals, and the like. Because of these wired connections, moving or adding remote terminals involves expensive and time consuming wiring or rewiring. These problems can be eliminated by replacing the wiring between the base station and the remote terminals by microwave frequency signals, such as is done currently for single users with cordless phones. However, the use of multiple cordless phones is not practical for use with PBX's because of problems with capacity, adjacent channel interference, and interference from other systems, as described below.

Currently, cordless phones have been allocated only a few channels at about 50 MHz by the FCC. Although adequate for residential use, the capacity is clearly inadequate for buildings using PBX's. Even if more bandwidth were allocated for cordless phones or wireless PBX's (for example, the mobile radio band at 900 MHz), the use of current phone systems would still have problems.

One problem is adjacent channel interference. Present cordless phone systems have fixed remote and base station transmit powers and can operate with signal power variations up to 80 dB at the receiver. Thus, such a system with one base station and multiple remotes can have received signals differing in power by as much as 80 dB at the base station which creates an adjacent channel interference problem.

Another problem is interference from other nearby systems. Signal propagation in buildings varies substantially with the position of the user resulting in a high probability that interfering signals from nearby systems are stronger than the desired signal. Such interference could easily block channels, thereby reducing capacity or abruptly terminating calls.

The above discussion also applies to wireless local area networks (LAN).

SUMMARY OF THE INVENTION

In accordance with the illustrative embodiment of the present invention the aforesaid problems are solved by a combination of 1) adaptive signal processing arrays using optimum combining at the base station for interference suppression and separation of desired signals, 2) adaptive power control at the remote transmitters to keep interference at acceptable levels, and 3) adaptive retransmission with time division in the direction from the base station to the remote terminals for communication therebetween, including sending power control information to the remote terminals. That is, by optimum combining, signals received by several antennas at the base station are weighted and combined to maximize a ratio which is obtained by dividing the signal power by the sum of the noise and interference power. This novel combination 1) permits frequency reuse with multiple simultaneous users per channel, thereby greatly increasing the capacity of the wireless PBX, or local area network, 2) eliminates the problem of adjacent channel interference through adaptive power control, and 3) reduces the problem of interference from other systems through interference suppressing adaptive arrays.

More particularly, adaptive signal processing arrays comprise a plurality of antennas at the base station, permitting a plurality of users in any one channel. Although the signals from all the remote terminals are received at a receiver in the base station, the desired signals from the corresponding remote terminal are separated by using optimum combining. If after adaptation a user's signal cannot be received adequately (i.e., the signal is below a predetermined threshold), the user is dynamically reassigned to a different channel. That is, if the interference is too strong, by dynamic channel assignment the user is assigned to a different channel.

Interference is minimized by keeping the signals transmitted from and received at the base station at the same power level. The received signals are kept at the same power level by extracting information about the power level of the signals received at the base station and by sending power control bits back to the corresponding remote terminal so that the signal level from the remote terminal may be adjusted either up or down until the power level of each of the signals received at the base station is at the same level. The transmitted signals are kept at the same power level by adaptive retransmission with time division as described below.

By adaptive retransmission, the base station transmits at the same frequency as it receives, using the complex conjugates of the receiving weights. With time division, a single channel is time shared by both directions of transmission by a plurality of users. With optimum combining, during transmission from the remote terminals to the base station, the antenna element weights are adjusted to maximize the signal to interference plus noise ratio at the receiver output. During transmission from the base station to the remote terminals, the complex conjugate of the receiving weights are used so that the signals from the base station antennas combine to enhance reception of the signal at the desired remote and to suppress this signal at other remotes. The advantage of optimum combining at both the remote and the base station is realized by using multiple antennas at the base station only.

DETAILED DESCRIPTION

Figure 1:
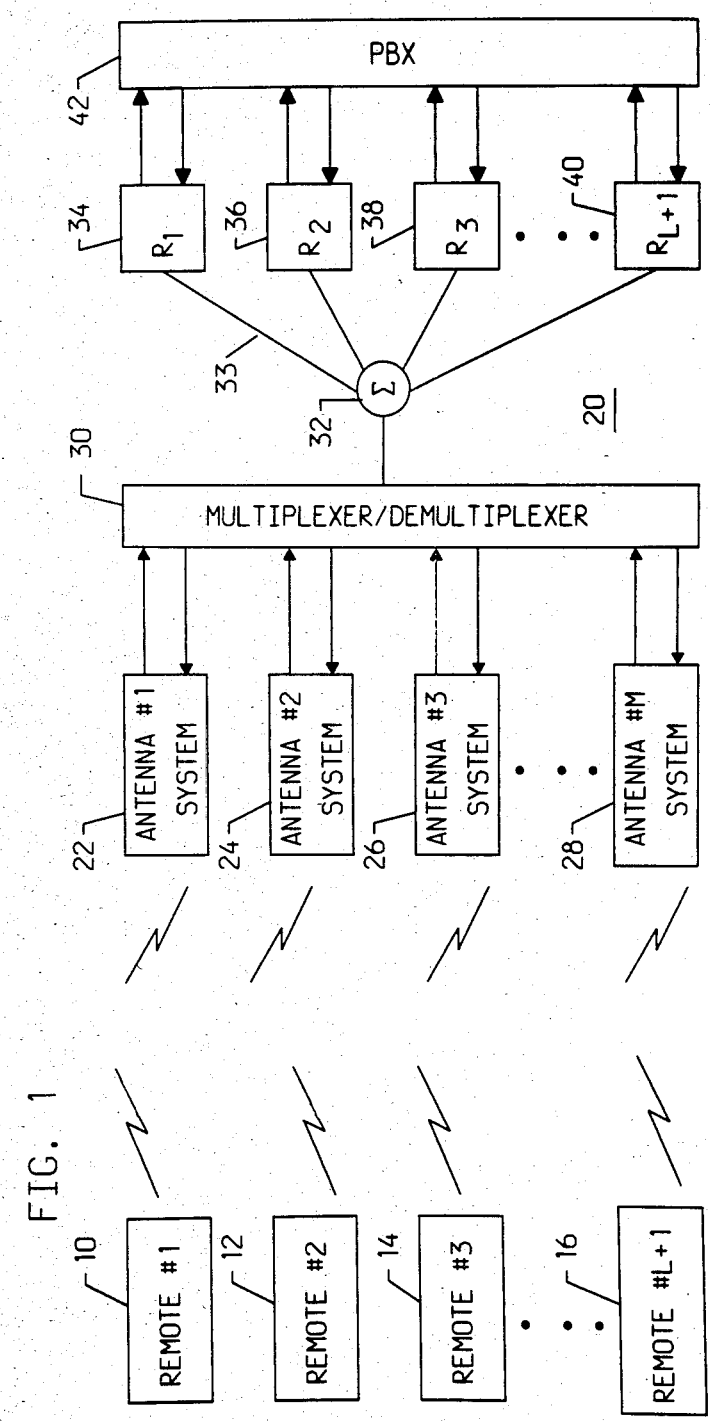
FIG. 1 is a block diagram of a PBX embodying the present invention.

Referring to FIG. 1, there is shown a wireless PBX system comprising L+1 remote terminals 10, 12, 14, ..., 16 which communicate via a single channel at microwave frequencies with a base station 20. All remote terminals transmit simultaneously, that is, during the same period. Likewise, all receive simultaneously during a different period. Base station 20 comprises a plurality of M antennas 22, 24, 26, ..., 28. The M antennas increase the capacity of the system. Initially in a PBX system, the number of remotes L+1 is less than M. The number of remote terminals may grow to be equal to M but may never exceed M. Up to M simultaneous users may be permitted on a channel, thereby increasing the capacity of the PBX system over a single user per channel system.

The microwave signals received at the base antennas are multiplexed at 30 where they are then distributed in parallel to the L+1 receivers 34, 36, 38, ..., 40 because each receiver communicates with a particular remote terminal. Although signals from all terminals are received in each receiver, the signals from a particular remote terminal are obtained by using optimum combining thereby nulling out the signals from the other remote terminals. Finally, the signals detected at a receiver are sent on to PBX switch 42. Signals from PBX 42 trace the reverse path through the aforesaid elements.

Information about the power levels of the signals received from a remote terminal are multiplexed into the bit stream prior to transmission from the base station. The power bits are extracted at the remote terminal where the power level of the signals are adjusted up or down for transmission to the base station. The power level of the signals are adjusted repeatedly until the signals received at base station 20 are all substantially at the same level. By this method both the capacity is increased and the interference is reduced.

Figure 2:
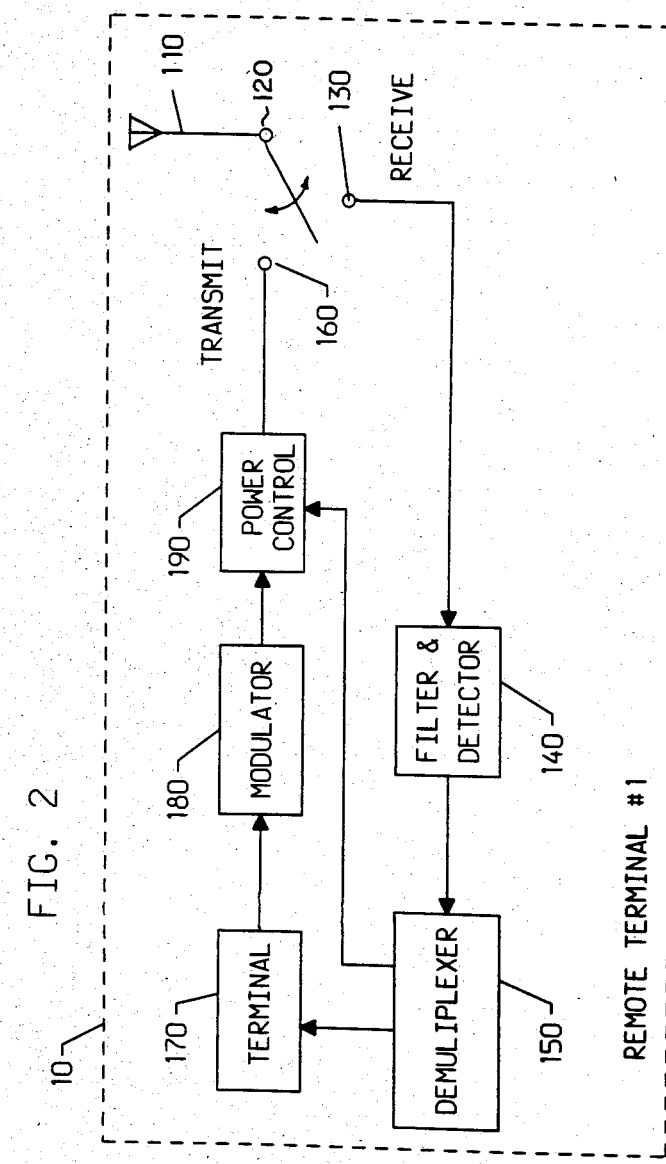
FIG. 2 is a block diagram of the essential components of a remote terminal.

Referring to FIG. 2, there is shown remote terminal 10 which is typical of the other L remote terminals. In a traditional PBX, terminal 170 is a telephone set. But terminal 170 may also be a computer terminal, a data set or the like. Signals from terminal 170 are modulated at 180. In the preferred embodiment, the data bits from the terminal modulate a carrier to generate a phase shift keyed (PSK) signal, code symbols which are used by the base station to distinguish signals from different remotes also modulate a carrier to generate an orthogonal PSK signal, and the two signals are summed. The power level of the modulated signals is adjusted at 190 in response to power control bits received from demultiplexer 150. The modulated signals are then transmitted via antenna 110 to base station 20 of FIG. 1.

Signals from base station 20 of FIG. 1 are received via antenna 110, filtered and detected at 140 and then demultiplexed at 150 into two streams: one stream represents data and is sent on to terminal 170, the other represents power control bits and is sent on to power control circuit 190. The power of the signals from modulator 180 is stepped up or down by a predetermined amount depending on whether the power control bit is a 1 or a 0, respectively. By this process the power levels of all the signals received at base station 20 of FIG. 1 from all L+1 remote terminals are maintained at substantially the same level. The method of generating the power control bits is described more fully hereinbelow.

Figure 3:
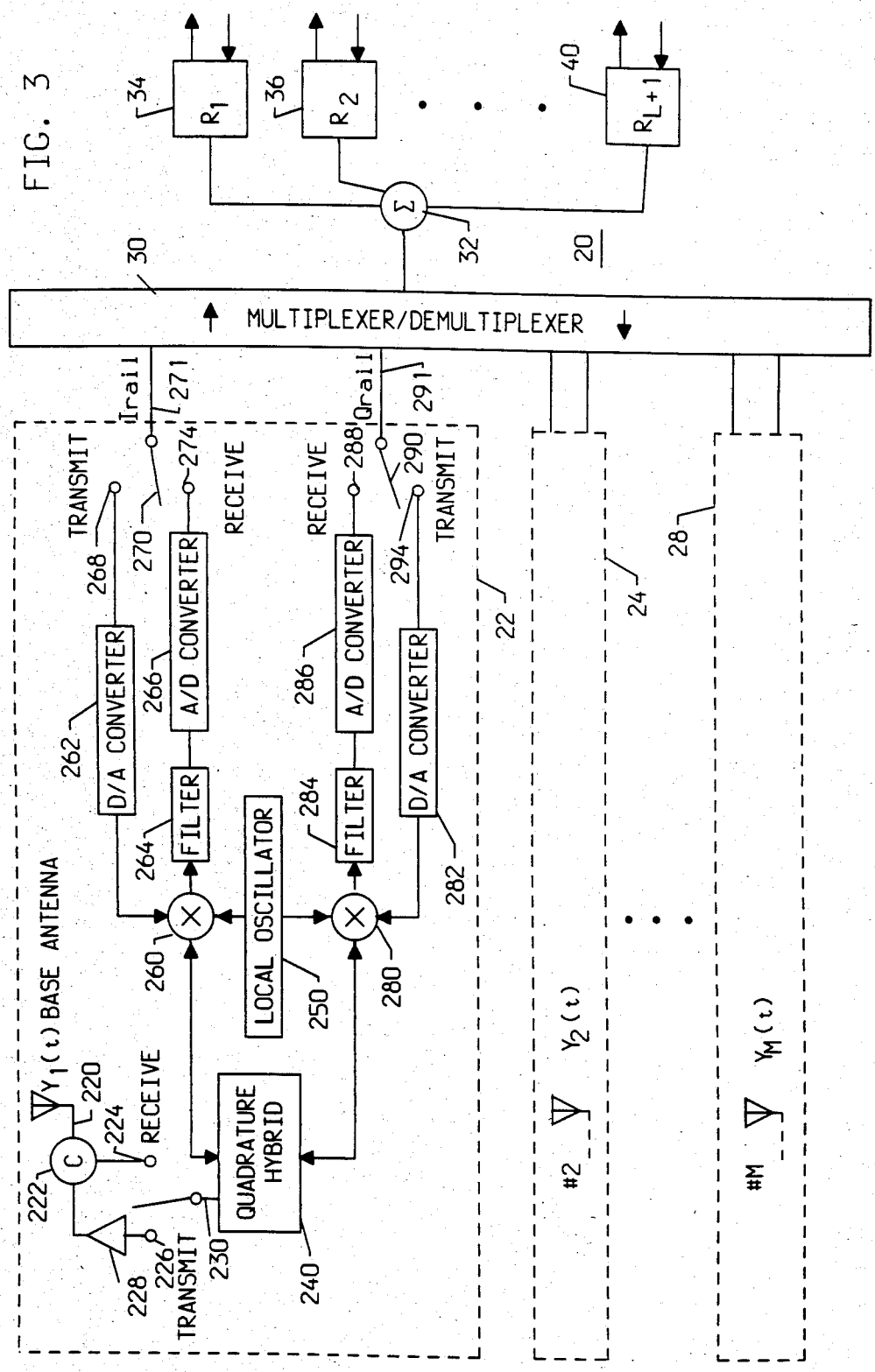
FIG. 3 shows the essential components of the base station in block diagram.
Figure 5:
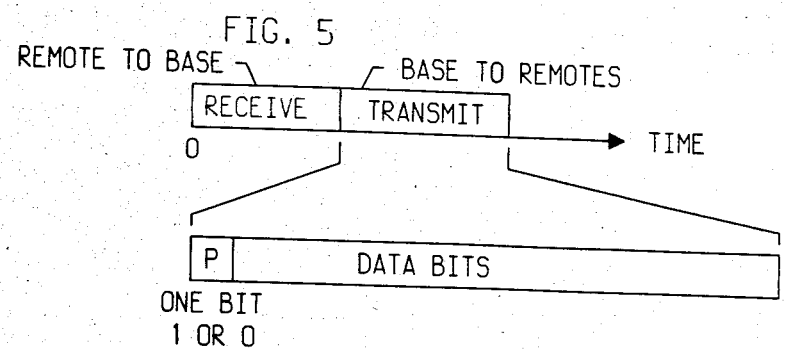
FIG. 5 shows a timing diagram.

Referring to FIG. 3, there is shown an M antenna diversity combining system comprising antenna systems 22, 24 ... 28 at base 20. During any given period, all the transmitters at the base station must transmit and all the remotes must receive simultaneously, for synchronization. Likewise, all remotes must transmit and all base station receivers must receive simultaneously during the same period. That is, all the antennas either receive simultaneously or transmit simultaneously under control of PBX switch 42 of FIG. 1. This is illustrated in FIG. 5.

Referring to FIG. 3 again, microwave signals, $y_1(t)$, are received from the remote terminals at antenna 220 and passed through circulator 222 to quadrature hybrid 240 where the signals are split into their inphase and quadrature components. The inphase components of the signals are mixed at element 260 with a microwave frequency carrier signal which is generated from local oscillator 250 in order to remove the carrier signal; the resultant signals are filtered at 264 and then converted from analog to digital in element 266 before being sent on via I rail 271 to multiplexor 30. Likewise, signals from local oscillator 250 are mixed at 280 with the quadrature components of the received microwave signals and then filtered at 284 to remove the microwave carrier signal. The filtered signals are then converted from analog to digital form before being sent on to multiplexer 30 via the Q rail 291.

These digital signals, along with the I rail and the Q rail signals from the remaining M−1 antennas, are sent via multiplexer 30 in a serial bit stream via fan out circuit 32 in parallel to every one of the receiver units 34, 36 ... 40 for processing and transmission to PBX 42. In the reverse direction, that is when PBX 42 of FIG. 1 is transmitting to the remote terminals, signals from receivers 34, 36 ... 40 are summed at 32 for each antenna and demultiplexed at 30; thereafter, the signals are sent to the appropriate antenna I rail or Q rail. The signal on I rail 271, for example, is converted from digital to analog at element 262 and the analog signals modulate the microwave frequency carrier signal from local oscillator 250. Likewise, the digital signals from Q rail 291 are converted to analog form at element 282. The signals then modulate the microwave frequency carrier signal from local oscillator 250. The two signals from the I rail and the Q rail are combined at quadrature hybrid circuit 240 and the output signals therefrom transmitted via antenna 220 to the remote terminals.

As stated hereinabove, the multiplexed stream of bits from I rail 271 and Q rail 291 and the other I rails and Q rails of the remaining antenna systems 24, ..., 28 of FIG. 3 is distributed in parallel to each of the receivers 34, 36, ..., 40. At receiver 34, which is illustrative of the other receivers and shown in FIG. 4, the aforesaid stream is demultiplexed at element 332 into a plurality of I rail and Q rail streams $x_{Ii}(t)$ and $X_{Qi}(t)$, respectively, shown for ease in understanding as $I_1$, $Q_1$; $I_2$, $Q_2$; $I_3$, $Q_3$; ...; $I_M$, $Q_M$. These I rail and Q rail bits are sent to a plurality of mixers 334, 336; 338, 340; ...; 342, 344 and to weight generation circuit 352. Weighting signals, $W_{Ii}(t)$ and $W_{Qi}(t)$ are generated in accordance with optimum combining (in the preferred embodiment, the least mean square (LMS) algorithm, a known process) from weight generation circuit 352 and are sent to the mixers 334, 336; 338, 340; ...; 342, 344.

A major difference between wireless terminals in offices and mobile radio is the fading rate. In mobile radio the fading rate is about 70 Hz. Thus, the weights must adapt in a few milliseconds and the remote's transmit power cannot be adjusted fast enough with feedback from the base station to follow the fading—in mobile radio, power control is used to adjust the average received power which is averaged over the fading. With wireless terminals, however, the fading rate is much less. For example, at 49 MHz a four mph velocity, such as walking with the remote terminal, produces a 0.29 Hz fading rate. This means, the weights can be adapted much more slowly, making implementation of optimum combining via the LMS algorithm on a chip much easier. Furthermore, because the fading rate is less, the dynamic range of the LMS adaptive array is greater. That is, the receiver can operate with higher interference to desired signal power ratios. Furthermore, because adaptive power control can be used to keep the instantaneous received power at a constant level rather than the average received power, the level of interference at the base station is reduced, and this permits greater interference suppression and more users per channel.

The weighted signals are then sent on to signal combiner 346 where they are summed to obtain the desired signal, $s_o(t)$, from a particular remote terminal and null out the signals from the other terminals. The desired signals are sent on to detector 350 for bit detection. The desired signals are also sent to weighting circuit 352. The detected signal is then sent on to PBX switch 42 of FIG. 1. If the signal is not above a predetermined threshold, the remote terminal is switched to a different channel. It is assumed that there is a signaling channel to all remotes for call setup, time division (transmit and receive) synchronization, and dynamic channel assignment.

At weight generation circuit 352, the received signals are used to adjust the weights thereby forming the first of two adaptive loops.

Signals to be transmitted from the PBX 42 (of FIG. 1) to the remote terminals are sent to multiplexer 348 where they are multiplexed with the power control bits generated from power control circuit 354. The power control bits are used by the remote terminals for controlling the power level of the signals transmitted from the terminals to the base station; this forms the second adaptive loop. The multiplexed signals are then transmitted through power divider 346 to the mixers 334, 336; 338, 340; . . . ; 342, 344 where they are weighted to generate the I rail and Q rail signals. The I rails carry the inphase signals and the Q rails carry the quadrature signals. The quadrature weights are, however, opposite in sign so that the transmit antenna pattern is the same as the adapted received antenna pattern. The aforesaid I rail signals and Q rail signals are multiplexed at 332 and sent on to summer 32 of FIG. 3.

Referring to FIG. 3 again, the multiplexed stream of bits from receivers 34, 36, . . . , 40 are summed at 32 and sent on to demultiplexer 30 where the stream is once again demultiplexed into the I rail signals and the Q rail signals for each of the M antennas.

A base station has M antennas which permits up to M communication paths over a single channel. Each additional channel requires the replication of the circuitry shown in FIGS. 3 and 4 with the possible exception of the antennas. That is, the M antennas may be shared by all channels.

The optimum combiner can be described mathematically using complex notation. Let the weight vector $\bar{w}$ be given by $$\bar{w} = \begin{vmatrix} w_{I1} \\ \cdot \\ \cdot \\ \cdot \\ w_{IM} \end{vmatrix} - j \begin{vmatrix} w_{Q1} \\ \cdot \\ \cdot \\ \cdot \\ w_{QM} \end{vmatrix}. \quad (1)$$

where the bar over a letter denotes a complex vector (or number in FIGS. 6, 7, and 8) and the received signal vector $\bar{x}$ is given by $$\bar{x} = \begin{vmatrix} x_{I1} \\ \cdot \\ \cdot \\ \cdot \\ x_{IM} \end{vmatrix} + j \begin{vmatrix} x_{Q1} \\ \cdot \\ \cdot \\ \cdot \\ x_{QM} \end{vmatrix} \quad (2)$$

The received signal consists of the desired signal, thermal noise, and interference and, therefore, can be expressed as $$\bar{x} = \bar{x}_d + \bar{x}_n + \sum_{j=1}^{L} \bar{x}_j, \quad (3)$$

where $x_d$, $x_n$, and $x_j$ are the received signal, noise, and jth interfering signal vectors, respectively, and L is the number of interfering signals. Furthermore, let $s_d(t)$ and $s_j(t)$ be the desired and jth interfering signals as they are transmitted, respectively, with $$E|s_d^2(t)| = 1 \ldots \quad (4)$$

and $$E|s_j^2(t)| = 1 \text{ for } 1 \leq j \leq L \ldots \quad (5)$$

Then $\bar{x}$ can be expressed as $$\bar{x} = \bar{u}_d s_d(t) + \bar{x}_n + \sum_{j=1}^{L} \bar{u}_j s_j(t), \quad (6)$$

where $\bar{u}_d$ and $\bar{u}_j$ are the desired and jth interfering signal propagation vectors, respectively.

The received interference-plus-noise correlation matrix is given by $$R_{nn} = E\left| \left( \bar{x}_n + \sum_{j=1}^{L} \bar{x}_j \right)^* \left( \bar{x}_n + \sum_{j=1}^{L} \bar{x}_j \right)^T \right| \quad (7)$$

where the superscripts * and T denote conjugate and transpose, respectively.

Assuming the noise and interfering signals are uncorrelated, it can be shown $$R_{nn} = \sigma^2 I + \sum_{j=1}^{L} \bar{u}_j^* \bar{u}_j^T \quad (8)$$

where $\pi^2$ is the noise power and, I is the identity matrix.

Finally, the equation for the weights that maximize the output SINR is $$\bar{w} = \alpha R_{nn}^{-1} \bar{u}_d^*, \ldots \quad (9)$$

where $\alpha$ is a constant, which does not affect the performance of the optimum combiner, and the superscript $-1$ denotes the inverse of the matrix. The output SINR is given by $$S/N = \frac{|\bar{w}^{\neq}\bar{u}_d^*|^2}{\sigma^2 \bar{w}^{\neq}\bar{w}} \qquad (10)$$

where $\neq$ denotes the complex conjugate transpose.

Figure 4:
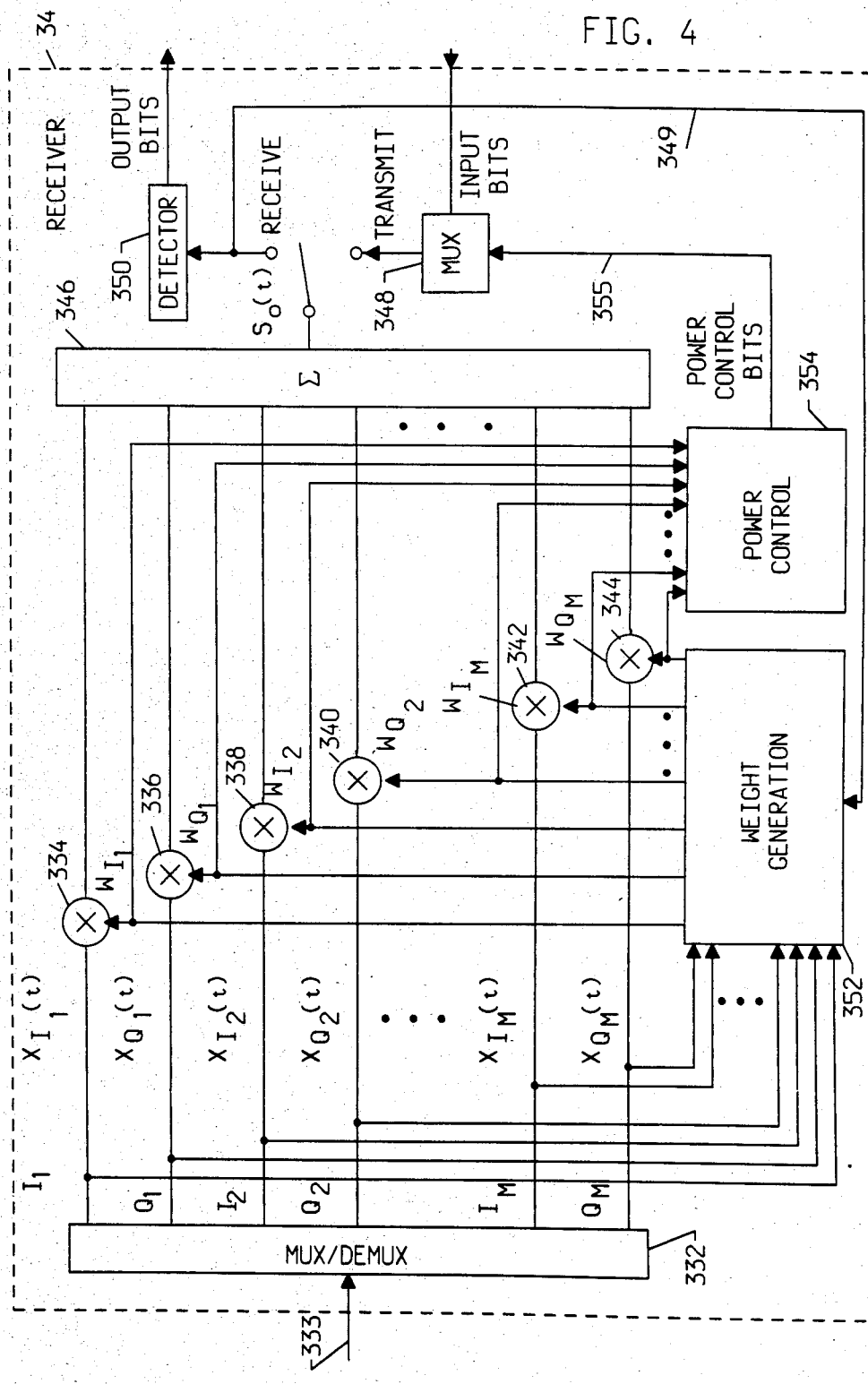
FIG. 4 shows details of a receiver.
Figure 6:
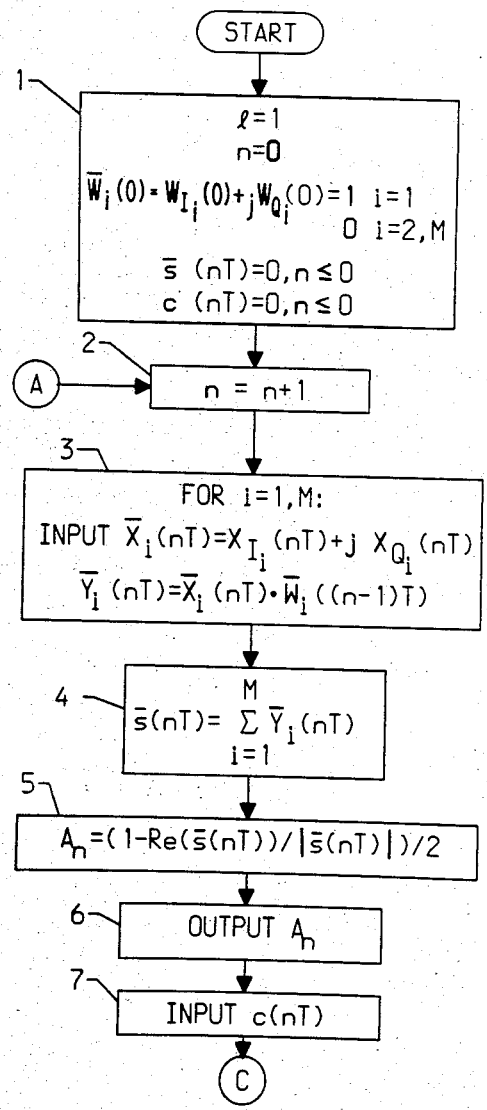
FIGS. 6 to 8 show a flow chart for the operation of the base station.
Figure 7:
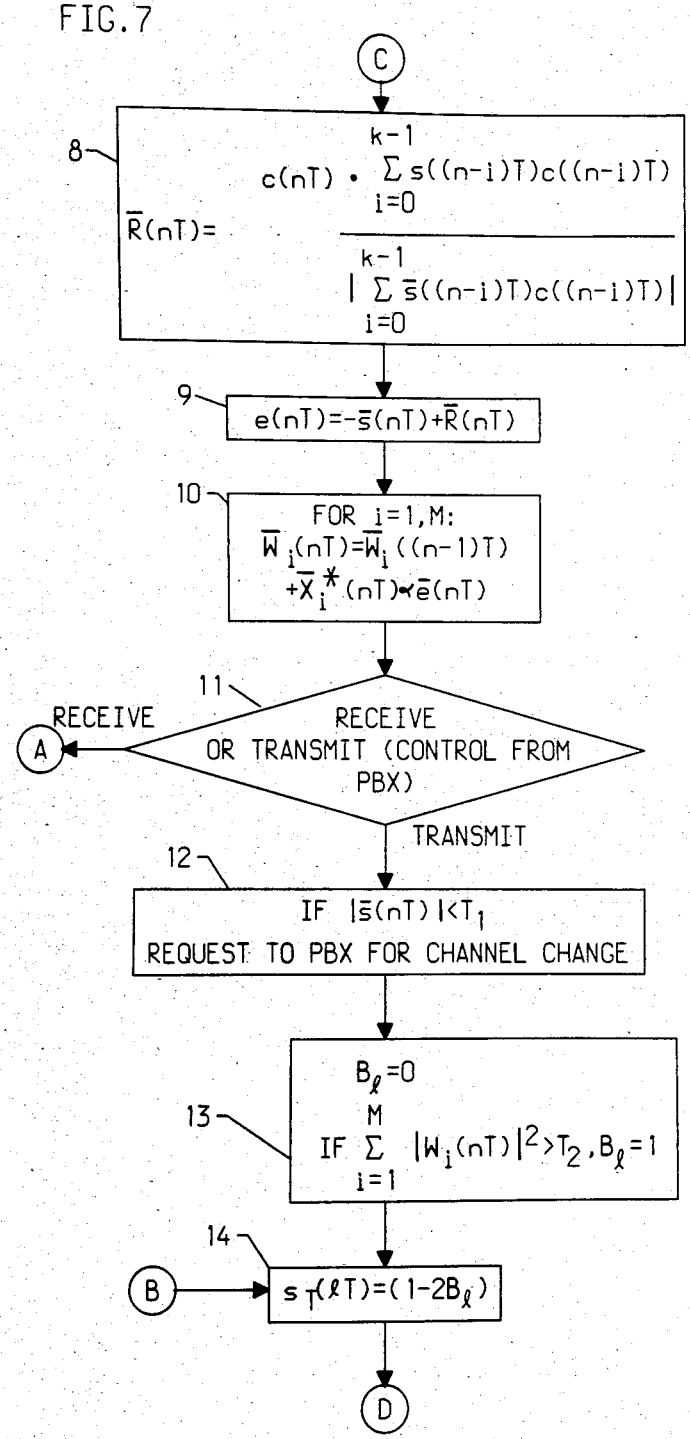

In the preferred embodiment, the functions of the elements in FIG. 4 are performed by a microcomputer. The following flow charts shown in FIGS. 6, 7 and 8 aid in understanding the operation of the base station. Referring more particularly to FIG. 6, box 1 shows that the base station receiver is initialized by setting the transmitted bit number, 1, to 1 and the received bit number, n, to 0. The weights are set arbitrarily for an initial omnidirectional antenna pattern for the first antenna with all the other antennas turned off. The bar over the symbols denotes a complex number. The memory in the receiver is then cleared.

The received bit number is incremented for the start of the receiving loop. This is shown in box 2, by making $n = n + 1$.

The received signals are inputted and the weighted signals are calculated. This is shown in box 3. $X_{Ii}$ corresponds to $I_i$ and $X_{Qi}$ corresponds to $Q_i$.

The next step is shown in box 4 where the array output $\bar{s}$ comprising the sum of the weighted signals is calculated.

In box 5, the output bit $A_n$ is processed at detector 350 in accordance with the following decision rule:
if Re $(\bar{s}(nT)) \geq 0$ then a 0 is received;
if Re $(\bar{s}(nT)) < 0$ then a 1 is received for detection of a phase shift key (PSK) signal, where Re $(\bar{s})$ denotes the real part of the complex number $\bar{s}$.

Referring to box 6, the detected bit $A_n$ is sent to PBX 42 of FIG. 1.

Referring to box 7, the code symbol c is next inputted. It is assumed that the code symbols at the base station receivers are synchronized with those in the received signals.

The reference signal $\bar{R}$ is calculated from the code symbols and the array output, where k is the memory of the digital filter in the reference signal generation loop. This is shown in box 8 in FIG. 7.

Referring next to box 9 the error signal $\bar{e}$ is calculated from the array output and reference signal.

The weights for the next received signal are calculated for each antenna, where the superscript * denotes the complex conjugate, and $\alpha$ is a constant which controls the adaptation time of the receiver. This is shown in box 10.

The aforesaid receiving loop is repeated; that is, the next bit is received and processed, unless PBX 42 requests change to the transmitting mode (that is, for adaptive retransmission). This is shown in box 11.

For dynamic channel assignment, if the received signal level is below threshold $T_1$ a request is sent to PBX 42 for the remote terminal to change to a different channel. This is shown in box 12.

The power control bit is set to 1 for remote terminals to increase the transmit power if the sum of weights is above a threshold $T_2$ or to 0 for remotes to decrease transmit power. This is shown in box 13.

The transmit signal input to the array $S_T$ is 1 if the transmitted bit is a 0 and $-1$ if the bit is a 1. This is shown in box 14.

Figure 8:
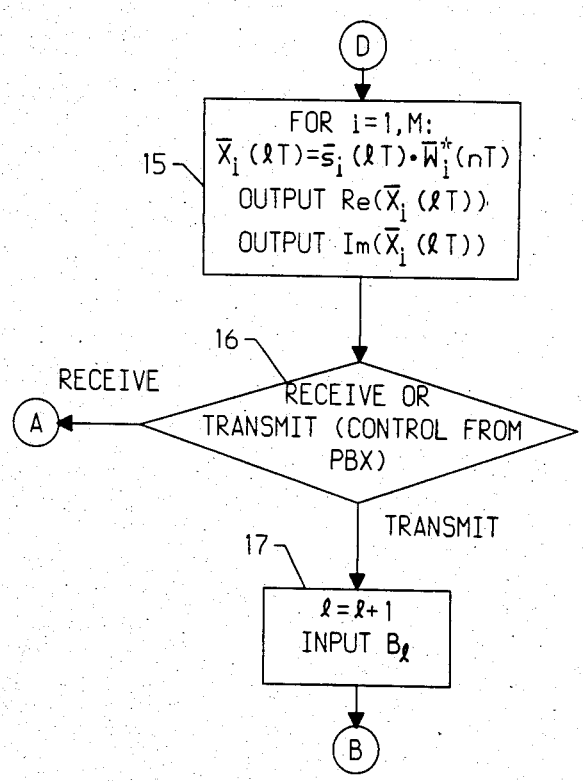

Box 15 in FIG. 8 shows that for each antenna the transmitted signal is calculated using the complex conjugate of the received weights, where Im $(\bar{s})$ denotes the imaginary part of the complex number $\bar{s}$.

Referring next to boxes 16 and 17 the transmitted bit number is incremented, the next bit is inputted, and the transmitting loop is repeated unless PBX 42 requests a change to the receive mode.

What is claimed is:

1. A wireless system for communication between a base station and a plurality of terminals at locations remote from said base station, said system comprising in combination
   means, including plural antennas for adaptive signal processing at said base station for interference suppression and separation of desired signals,
   means for adaptive power control at transmitters located at said terminals for reducing interference to acceptable levels, and
   means for adaptive retransmission with time division in the direction from said base station to said terminals for communications therebetween and for sending power control information to said terminals.

2. The wireless system of claim 1 wherein said means for adaptive power control comprises means for generating power control bits which are multiplexed into the data bits transmitted from said base station to said terminals for adjusting the power level of the signals transmitted from said terminals so that the power levels of the signals received at the base station are substantially the same.

3. The wireless system of claim 1 wherein said base station comprises means for comparing the power level of the signals received thereat with a threshold level so that if a signal level is below said threshold the signals from the corresponding terminal may be reassigned dynamically to a different channel.

4. A base station for use in a wireless system for communications between said base station and a plurality of terminals at locations remote from said base station comprising
   means, including plural antennas for adaptive signal processing for interference suppression and separation of desired signals,
   means for generating power control bits for permitting adaptive power control at transmitters located at said terminals so that the power levels of the signals received at said base station are substantially at the same levels for reducing interference to acceptable levels, and
   means for adaptive retransmission from said base station to said terminals for base station to remote communications and for sending power control information to said terminals.

5. The base station of claim 4 further comprising means for comparing the power level of the signals received thereat with a threshold level so that if a signal level is below said threshold the signals from the corresponding terminal may be reassigned dynamically to a different channel.

6. In a wireless system comprising a base station and a plurality of terminals at locations remote from said base station, a method for users communication between said base station and said plurality of terminals comprising the steps of processing signals received from said terminals at said base station which has plural antennas by the method of adaptive signal processing for interference suppression and separation of desired signals, and communicating between said base station and said remote terminals by the method of adaptive retransmission in the direction from said base station and said remote terminals and for sending power control information to said terminals.

7. The method of claim 6 wherein said adaptive power control step comprises the further step of generating power control bits which are multiplexed into the data bits transmitted from said base station to said terminals for adjusting the power level of the signals transmitted from said terminals so that the power levels of the signals received at the base station are substantially the same.

8. The method of claim 7 further comprising the step of reducing interference in said signals received at said remote terminals to acceptable levels using the method of adaptive power control.

9. The method of claim 6 comprising the further step of comparing the power level of the signals received at said base station with a threshold level so that if a signal level is below said threshold the signals from the corresponding terminal may be reassigned dynamically to a different channel.

* * * * *